United States Patent
Knudson

(10) Patent No.: US 9,400,805 B2
(45) Date of Patent: Jul. 26, 2016

(54) IMAGE-RELATED SOCIAL NETWORK METHODS AND ARRANGEMENTS

(75) Inventor: Edward B. Knudson, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 478 days.

(21) Appl. No.: 13/433,870

(22) Filed: Mar. 29, 2012

(65) Prior Publication Data

US 2013/0259297 A1  Oct. 3, 2013

(51) Int. Cl.
- *G06K 9/62* (2006.01)
- *G06F 17/30* (2006.01)
- *G06K 9/00* (2006.01)
- *G06K 9/22* (2006.01)
- *G06Q 50/00* (2012.01)

(52) U.S. Cl.
CPC ...... *G06F 17/30244* (2013.01); *G06K 9/00671* (2013.01); *G06K 9/228* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 7,171,018 | B2 | 1/2007 | Rhoads et al. |
| 7,505,605 | B2 | 3/2009 | Rhoads et al. |
| 7,545,951 | B2 | 6/2009 | Davis et al. |
| 8,036,420 | B2 | 10/2011 | Evans et al. |
| 2005/0169496 | A1* | 8/2005 | Perry .......................... 382/100 |
| 2009/0164429 | A1 | 6/2009 | Curtis |
| 2010/0253787 | A1* | 10/2010 | Grant ........................ 348/207.1 |
| 2011/0047013 | A1* | 2/2011 | McKenzie, III ............. 705/14.4 |
| 2012/0010929 | A1* | 1/2012 | Kolli et al. ................. 705/14.16 |
| 2012/0028577 | A1 | 2/2012 | Rodriguez |
| 2012/0102124 | A1 | 4/2012 | Osterdahl |
| 2012/0150598 | A1* | 6/2012 | Griggs ....................... 705/14.16 |
| 2012/0208592 | A1* | 8/2012 | Davis et al. ................ 455/556.1 |
| 2012/0210233 | A1 | 8/2012 | Davis |
| 2012/0233073 | A1 | 9/2012 | Graham |
| 2012/0300974 | A1 | 11/2012 | Rodriguez |
| 2013/0046823 | A1* | 2/2013 | Mitchell ............ G06Q 30/0269 709/204 |
| 2013/0094702 | A1 | 4/2013 | Rodriguez |
| 2013/0097630 | A1 | 4/2013 | Rodriguez |
| 2013/0132292 | A1* | 5/2013 | Lamb et al. .................... 705/318 |
| 2013/0258117 | A1* | 10/2013 | Penov et al. .............. 348/207.1 |
| 2013/0260727 | A1 | 10/2013 | Rodriguez |

OTHER PUBLICATIONS

Henry. "Shop Smarter with the Consumer Reports Mobile App." PC Magazine Online, Oct. 19, 2010.*

(Continued)

*Primary Examiner* — Jon Chang
(74) *Attorney, Agent, or Firm* — Digimarc Corporation

(57) ABSTRACT

In one aspect, a user captures an image of a physical object (e.g., a grocery item) with a smartphone. The depicted object is identified, such as by extracting fingerprint or watermark data from the imagery. Other imagery depicting that object—or depicting related objects—is identified on the web, and is displayed to the user on the smartphone screen. The user may select one or more of these images and direct that they be posted to a social network account (e.g., Pinterest) associated with the user. In another aspect, the user's location is sensed (e.g., an aisle of a department store), and a collection of images depicting nearby products is presented to the user for selection and posting to a social networking service. A great variety of other features and arrangements are also detailed.

20 Claims, 3 Drawing Sheets

(56) References Cited

OTHER PUBLICATIONS

The article, "TheFind—Social Shopping with Facebook Integration" at http://www.insidefacebook.com/2010/09/02/thefind-social-shopping/, Sep. 2, 2010.*

The Facebook.com page for "KMC Tech Guy" at https://www.facebook.com/kmctechguy, 2011.*

The article, "Make Your iPhone Your Personal Shopping Assistant" at http://mashable.com/2010/11/01/shopsavvy-4-iphone/, Nov. 1, 2010.*

The Wikipedia article, "Social graph" at http://en.wikipedia.org/wiki/Social_graph, accessed Oct. 27, 2014.*

The article, "How to Buy Used Stuff for Cheap on Facebook" at http://www.makeuseof.com/tag/how-to-buy-used-stuff-for-cheap-on-facebook/ (hereinafter referred to as "the Makeuseof article"), Nov. 15, 2009.*

The article, "Image Recognition Startup SnapTell Acquired by Amazon Subsidiary A9.com" at http://techcrunch.com/2009/06/16/image-recognition-startup-snaptell-acquired-by-amazon-subsidiary-a9com/, Jun. 16, 2009.*

Merriam-Webster.com definition of "brand" at http://www.merriam-webster.com/dictionary/brand, 2015.*

The Facebook.com page for "Coptool" at https://www.facebook.com/Coptool, 2010.*

"Batch Upload Photos and Video to Facebook from Android Phones" (found at http://www.adweek.com/socialtimes/batch-upload-photos-and-video-to-facebook-from-android-phones/61561), May 2, 2011.*

Crum, Why Stop at the Web—Facebook to Take Over the World, WebProNews, Aug. 26, 2010.

Evangelista, Physical Like Buttons Might Preview Facebook Places 2.0, SFGate, Aug. 25, 2010.

Fitzsimmons, Now QR Codes Can Generate Likes on Facebook, SocialTimes, AdWeek, Aug. 25, 2010.

Kinard, Getting Physical With Social Media, Feb. 19, 2011.

\* cited by examiner

IMAGE-RELATED SOCIAL NETWORK METHODS AND ARRANGEMENTS

TECHNICAL FIELD

The present disclosure concerns social network services.

BACKGROUND AND SUMMARY

Social networks are widely used to share information among friends. Increasingly, friends share indications that they "like" particular content, such as web pages, songs, etc.

The present disclosure concerns, in some respects, extending concepts of social networks and "liking" to the realm of physical objects (such as may be encountered in retail stores), through the use of smartphone cameras.

In one particular embodiment, shopper Alice comes across a favorite cookie mix in the supermarket. Her friends raved about the cookies at a recent neighborhood get-together, and she wants to share the secret. With her smartphone, Alice takes a picture of the packaged mix, and an associated smartphone app gives her the option of "Liking" the product on Facebook.

When she selects this option, the image is analyzed to derive identification data (e.g., by extracting an image fingerprint, or by decoding an invisible digital watermark). This identification data is passed to a database, which determines the item to which it corresponds. An entry is then made to Alice's Facebook profile, indicating she "Likes" the product (in this case, a package of Bob's Red Mill brand gluten free shortbread cookie mix). A corresponding notation instantly appears in her friends' Facebook news feeds.

In some arrangements, the app gives the shopper the opportunity to explore, review, and "like," related items, such as other products of the same brand. For example, by information presented by the app, Alice may discover that Bob's Red Mill also offers a gluten-free vanilla cake mix. Pleased with her experience with the cookie mix, she decides to try a package of the cake mix for her son's upcoming birthday. Finding it out of stock on the grocery shelf, Alice selects another option on her smartphone app—electing to purchase the item from Amazon (shipping is free with her Amazon Prime account).

In another aspect, the present technology is used to share images via social networks, such as on Pinterest.

Pinterest is an online service that enables people to share images they find on the web. Users compile collections of images (pinboards), which are typically grouped by a common subject (e.g., vases) or theme (e.g., red items).

In an exemplary scenario, Ted has a fascination for rakes. He has a Pinterest pinboard where he's collected images depicting the variety of rakes he's found on the web. While on an errand looking for something else, he happens across a "carpet rake" at the mall department store. Intrigued, he uses his smartphone to snap an image of the barcode label found on the product's handle.

A smartphone app gives him an option of posting to his Pinterest account. While the barcode, per se, has no appeal, the app automatically decodes the barcode and presents a gallery of product photos associated with the barcode identifier. Moreover, the app presents images of other carpet rakes. (Who knew there could be such diversity in carpet rakes?) Ted selects several of the product photos with a few taps, and a moment later they are all posted to his rakes pinboard on Pinterest.

The present technology spans a great number of other features and implementations; the foregoing is just a sampling.

DETAILED DESCRIPTION

The term "social network service" is used in this disclosure with its ordinary meaning. As is familiar, "social network service" (or "social networking service") generally refers to an online service, platform, or site that focuses on building and reflecting social networks or social relations among people, who share, for example, interests, activities or other affiliation. A social network service typically includes a representation of each user (often a profile), his/her social links, and a variety of additional services. Most contemporary social network services are web-based and provide means for users to interact over the Internet, such as by public and/or private messaging, and by sharing photos.

Examples of popular social network services include Facebook, Pinterest, Flickr, Google+ and LinkedIn, although different services will doubtless become popular in the future.

Many social networking services provide features allowing users to express affinity for certain content (e.g., status updates, comments, photos, links shared by friends, websites and advertisements). On Facebook, this takes the form of a "Like Button," which is activated by a user to indicate they "like" associated content. The concept is present, with different names, in other social networking sites. For example, Google has a "+1" button, and Twitter has a "Follow" button. For expository convenience, this concept is referenced herein by the un-capitalized term "liking." (As actually manifested on most social networking services, "liking" involves storing—and commonly displaying—data reflecting a user's affinity for an item.)

Use of the above-noted terms in the appended claims should be construed in accordance with the foregoing.

Figure 1:
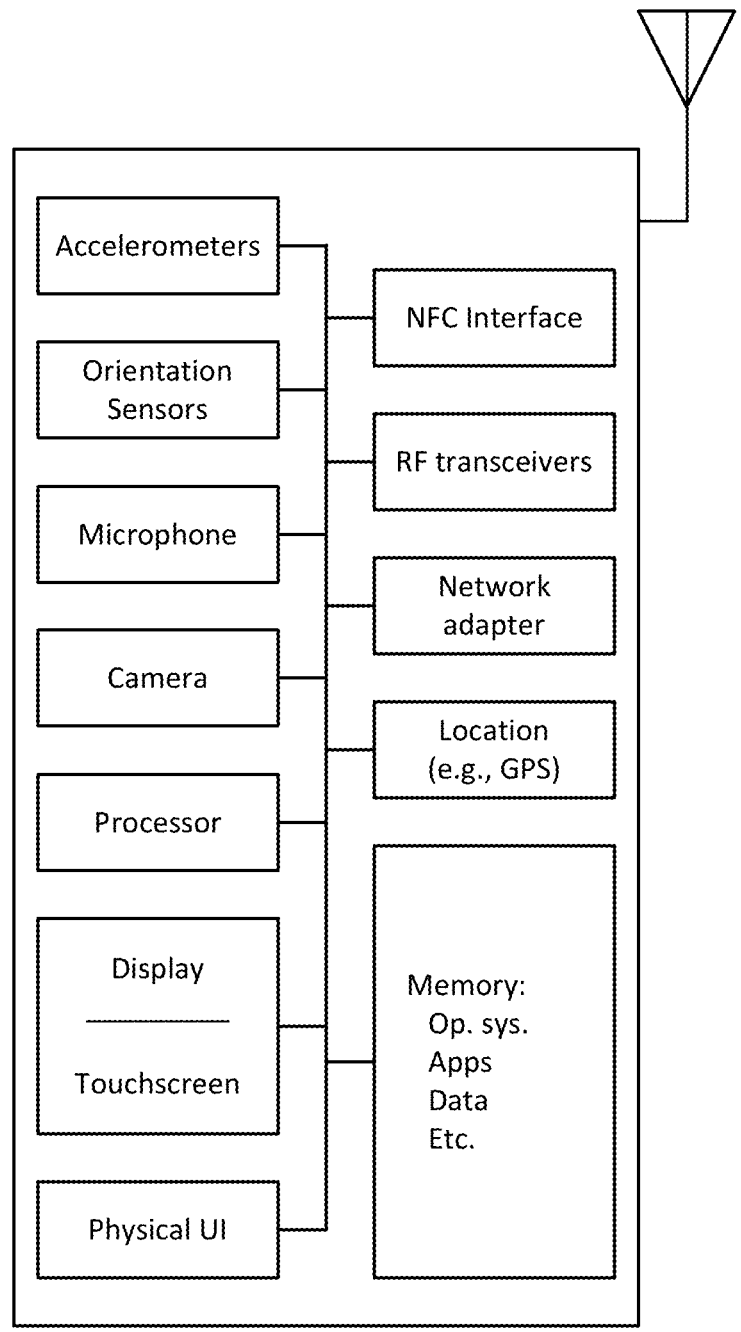
FIG. 1 is a block diagram of a smartphone, which can be used in embodiments of the present technology.

As indicated earlier, implementations of the present technology commonly involve imagery captured by a user's smartphone. FIG. 1 shows a block diagram of a representative smartphone, including a camera, a processor, a memory, and a wireless interface.

The camera portion includes a lens, an autofocus mechanism, and a sensor (not particularly shown), which cooperate to provide image data corresponding to an object imaged by the camera. This image data is typically stored in the smartphone memory. Also stored in the smartphone memory are instructions, including operating system software and app software, which are used to process the image data.

In the depicted smartphone, these software instructions process the image data to extract or derive image-identifying data from the image data. Various such arrangements are known, including digital watermarking and image fingerprinting approaches.

Once image-identifying data has been extracted, it is sent to a remote server, which uses this data to obtain additional information about the image, or about the object depicted in the image. If the identification data is an extracted digital watermark payload, it is looked-up in a database to access a store of metadata associated with the image/object. If the identification data is image fingerprint data, a database search is conducted to identify closest-matching reference fingerprint data. Again, based on this operation, a store of metadata associated with the image/object is accessed. Among the accessed metadata is typically a textual description of the object (e.g., "Bob's Red Mill brand gluten free shortbread cookie mix"). In the case of a supermarket product, additional metadata may include a UPC code, a product weight, etc. In the case of a photograph found in a magazine, the metadata may identify the copyright owner, and detail prices for different reproduction/use licenses.

Figure 3:
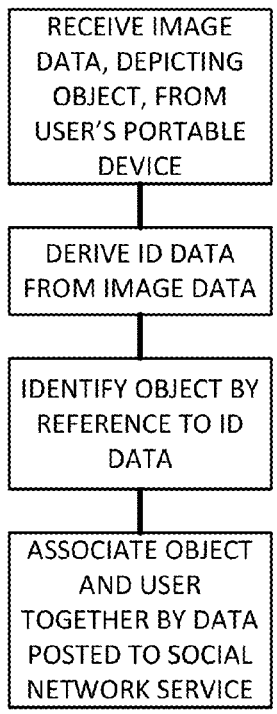
FIGS. 3-6 are flowcharts detailing certain methods according to the present technology.

In the illustrative embodiment, the smartphone app additionally acts to associate the object with the user, via a data posted to a social network service. In particular, the app may upload the image to the user's Facebook or Pinterest account. Thus, the user-captured image will appear in newsfeeds of the user's Facebook friends, or on a user pinboard published by Pinterest. The acts described in this paragraph and in the preceding paragraphs are generally shown in the flowchart of FIG. 3.

If the user captures an image of a cookie mix in a supermarket, and the system identifies the product from its visual features (watermark or fingerprint), the system can use this knowledge to then locate alternative pictures of the same product. These alternate pictures may be presented to the user on the smartphone—providing the user the opportunity to post one or more of these alternate images to the social networking service (either instead of, or in addition to, the user-captured image). Thus, instead of a slightly blurry, ill-lit snapshot of cookie mix captured by the user in the grocery aisle, the social networking service may instead be provided a marketing photo of the product, e.g., from the Bob's Red Mill company's web site (or a hyperlink to such an image).

Knowing the identity of the object photographed by the user, the system can similarly identify related objects, and related images. The relationship can be of various types, e.g., products from the same company (e.g., Coke soft drink and Dasani bottled water), similar products from different companies (Jimmy Choo biker boots and Steve Madden Banddit boots), etc. Product recommendation software, such as is used by Amazon and other retailers, can be used to identify other items that may be of interest to a person who photographs a particular product. (Exemplary recommendation systems are detailed, e.g., in Amazon's U.S. Pat. No. 8,032,506 and in 4-Tell's patent publication 20110282821.)

Figure 4:
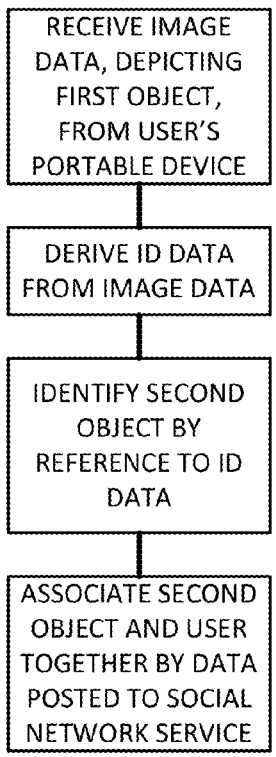
Figure 5:
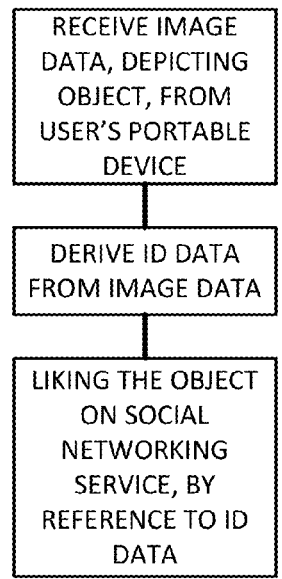

The present system thus can provide the user with imagery, or other information, about these related products. The user may then elect to post any of this information to their social networking service account (or "like" the depicted items). The acts described in this paragraph and in the preceding paragraphs are generally shown in the flowchart of FIGS. 4 and 5.

Figure 2:
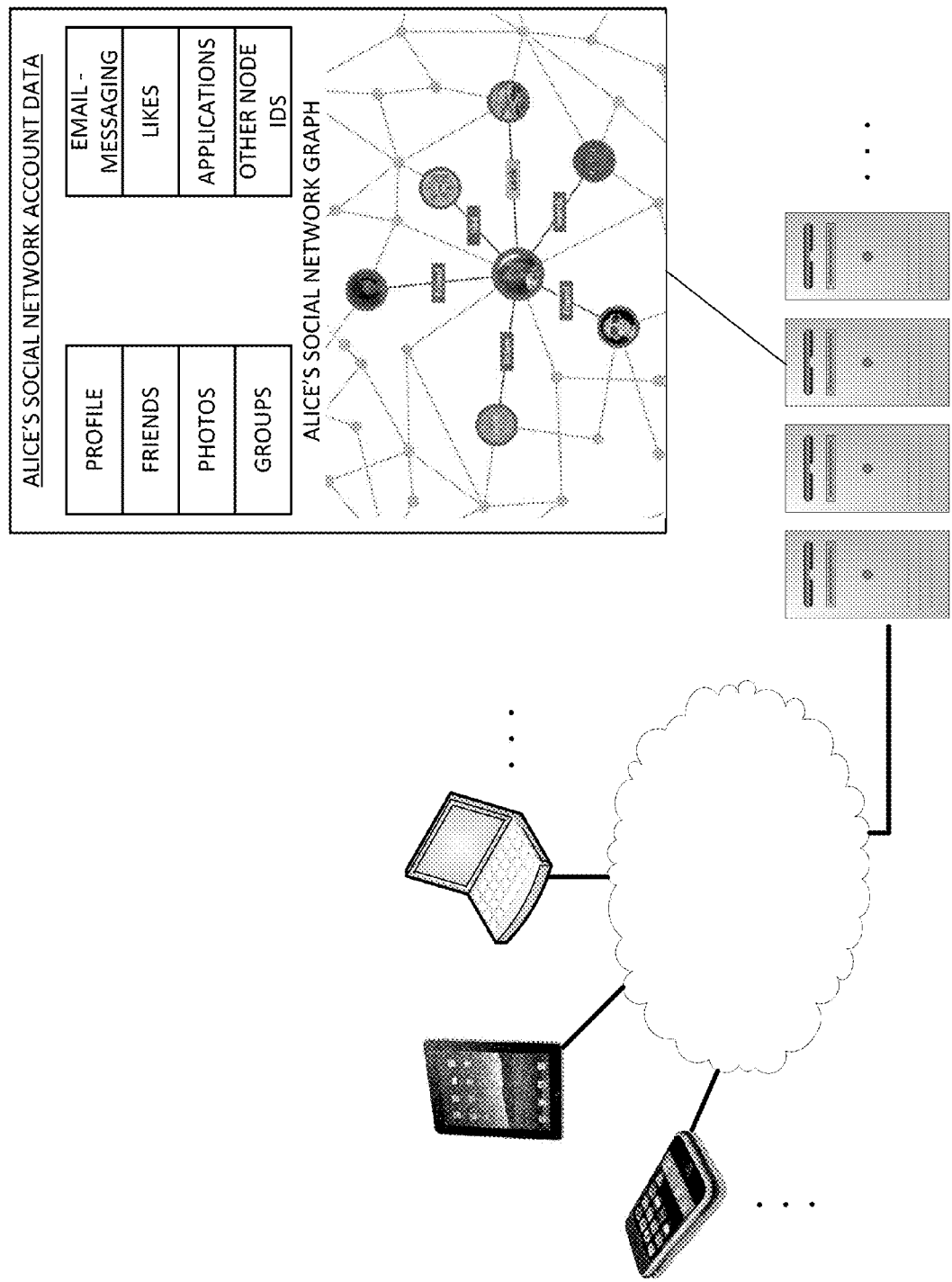
FIG. 2 is a diagram of a computing environment in which the present technology can be utilized.

FIG. 2 provides a view of the larger system. On the left are the client devices (tablets, smartphones, laptops), by which users access their social network accounts, and by which they may take pictures of items of interest. These devices connect to the internet, which links them to a bank of servers at the social network site. These servers contain the programming instructions that implement the social network functionality. These servers also contain the data associated with each user's account.

A graphical depiction of Alice's social network account is shown on the right of FIG. 2. Her account comprises a collection of data including profile information (name, town, age, gender, etc.), and information concerning friends, photos, groups, emails, likes, applications, etc. Much of this data is not literal text (e.g., friends' names), but rather comprises unique numeric or alphanumeric identifiers (e.g., 19292868552). Each such identifier is associated with various data and properties (including text and, in the case of pictures, image data). This data is typically stored elsewhere in the social network server farm and is accessed, when needed, by use of the unique identifier as an indexing mechanism.

Much of Alice's account data comprises graph information memorializing her relationships to different individuals, websites, and other entities. In network terminology, the individuals/entities commonly take the role of network "nodes," and the relationships between the individuals/entities (likes, friend, sister, employee, etc.) take the role of "ties" between the nodes. ("Nodes" are sometimes termed "objects," and "ties" are sometimes termed "links," "edges," "connections" or "actions.") "Liking" an item on Facebook is manifested by adding a link to the user's network graph, expressing the "like" relationship between the user and a node corresponding to the liked item. As with nodes, links are assigned unique identifiers, and are associated with various stored data and properties.

The foregoing is familiar to those skilled in social networking technology. Among such information familiar to these artisans is the Facebook Graph API reference documentation, which is published on the web, e.g., at https://developers<dot>facebook<dot>com/docs/reference/api/.
(The <dot>convention is to prevent this information from being rendered as an active hyperlink when displayed, per Patent Office guidance.)

Another use of the present technology concerns a user who encounters a beautiful image in a magazine (e.g., National Geographic), and wishes to post it to their Pinterest account. Again, the user snaps an image of the magazine page with a smartphone, and image processing is applied to identify the image. This identification may take the form of the magazine name, date, and page number. Or the identification may provide the photographer name, and a title or identification code for the photograph in the photographer's catalog. In either event, the user is presented a web-stored version of the photograph, and can elect to post it to their social network account.

As before, the identification information also allows related images to be identified (e.g., from the same article or issue of National Geographic, or from the photographer's image collection), which the user can elect to review and—if desired—post to their social network account.

Other Comments

While the detailed arrangements involve imagery captured with a user's smartphone camera, this is not essential. For example, implementations of the present technology can utilize image data obtained otherwise, such as electronically transmitted from another source (e.g., a friend's smartphone), or obtained from the web.

Likewise, while software on the smartphone performs extraction of the identification data from the image data in the detailed arrangements, this, too, is not essential. For example, the phone can send the image data to a processor remote from the phone (e.g., at the social networking service or in the cloud), which can perform extraction of the identification data. Or the extraction can be distributed, with initial phases of the process (e.g., filtering, and or FFT transforming) performed on the handset, and latter phases performed in the cloud.

As noted earlier, the technology also finds application with barcodes. A barcode can be photographed with a smartphone, and its payload data can be decoded (either locally at the smartphone, or sent to another computer for decoding). The decoded barcode data is then used to access a product database to obtain information about the associated product. Once the product has been identified, the other detailed methods can be utilized.

While certain of the detailed arrangements involve uploading an image to a social networking site, similar functionality can be achieved otherwise. For example, a link to the picture (e.g., a URL) may be uploaded to the social networking site, enabling retrieval of the picture from another repository at which the photo is stored (e.g., at Flickr, Google Docs, a user's personal web page, etc.).

When an image is identified, metadata associated with the image may be accessed to determine whether re-distribution of the image if permitted. Some image proprietors are eager to have their imagery re-distributed (e.g., promotional imagery for commercial products); others are not. The smartphone app can vary its behavior in accordance with such metadata. For example, if the metadata indicates that redistribution is not permitted, this fact may be relayed to the user. The software may then present alternate imagery that is similar (e.g., in subject matter or appearance) but is authorized for redistribution.

It will be recognized that the technology can be used with sources other than product packaging and labeling. For example, imagery may be captured from a point-of-purchase display (e.g., a placard), a magazine advertisement, or other printed substrates.

Moreover, product-identifying information may be determined from sources other than products and barcodes. For example, a product identifier may be read from an NFC (RFID) chip on a product, on a shelf display, or elsewhere, using the NFC reader provided in many smartphones.

Still further, acoustic identification may sometimes be used (e.g., ultrasonic signals, such as are used to identify retail stores to the ShopKick app). In such arrangements, a user's phone may detect a unique ultrasonic signature that is present in a home furnishings aisle at Macy's department store. The smartphone can use this information to determine the phone's location, which is then provided to a database that associates such location information with collections of images depicting nearby merchandise. These images may be presented on the smartphone display to the user, who may then elect to like one or more of these products, or post one or more of the images (or related images, discovered as described above) to the user's social network account as described above. (Shopkick's technology is further detailed in patent publication 20110029370.)

Figure 6:
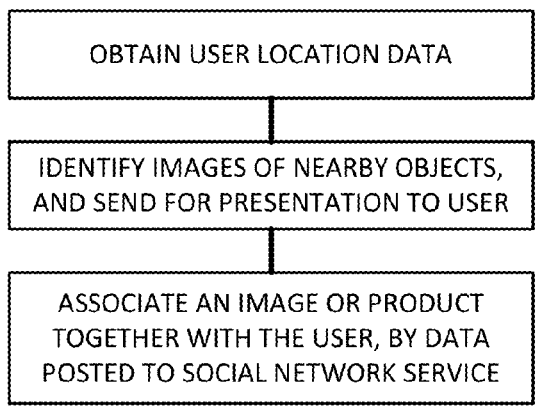

In still other arrangements, such functionality can be based on location data determined otherwise. A variety of indoor location technologies are known and are suitable for such use. One particular such technology is detailed in the assignee's patent 7,876,266, patent publication 20090213828 and in pending application Ser. No. 13/179,807, filed Jul. 11, 2011 (now U.S. Pat. No. 8,463,290), and Ser. No. 13/187,723, filed Jul. 21, 2011 (now published as 20120309415). The acts described in this paragraph and in the preceding paragraph are generally shown in the flowchart of FIG. 6.

While reference was made to app software on a smartphone that performs certain of the detailed functionality, in other embodiments these functions can naturally be performed otherwise—including by operating system software on the smartphone, by a server at a social networking service, by another smartphone or computer device, distributed between such devices, etc.

While reference has been made to smart phones, it will be recognized that this technology finds utility with all manner of devices—both portable and fixed. PDAs, organizers, portable music players, desktop computers, laptop computers, tablet computers, netbooks, wearable computers, servers, etc., can all make use of the principles detailed herein. Particularly contemplated smart phones include the Apple iPhone 4s, and smart phones following Google's Android specification (e.g., the Motorola Droid 4 phone). The term "smart phone" should be construed to encompass all such devices, even those that are not strictly-speaking cellular, nor telephones (e.g., the Apple iPad device).

(Details of the iPhone, including its touch interface, are provided in Apple's published patent application 20080174570.)

Reference was made to digital watermark and image fingerprint extraction techniques. Examples of the former are detailed, e.g., in Digimarc's U.S. Pat. No. 6,590,996 and in published application 20100150434. Fingerprint techniques are exemplified by the SIFT, SURF, ORB and CONGAS algorithms. SIFT, SURF and ORB are each implemented in the popular OpenCV software library (e.g., version 2.3.1). CONGAS is used by Google Goggles for that product's image recognition service, and is detailed, e.g., in Neven et al, "Image Recognition with an Adiabatic Quantum Computer I. Mapping to Quadratic Unconstrained Binary Optimization," Arxiv preprint arXiv:0804.4457, 2008. Use of such technologies to obtain object-related metadata is detailed, e.g., in the assignee's patent publication 20070156726, as well as in publications 20120008821 (Videosurf), 20110289532 (Vobile), 20110264700 (Microsoft), 20110125735 (Google), 20100211794 and 20090285492 (both Yahoo!).

Other of the assignee's work concerning social networks is detailed in patent application Ser. No. 13/425,339, filed Mar. 20, 2012 (now published as 20130097630).

Similarly, this technology also can be implemented using face-worn apparatus, such as augmented reality (AR) glasses. Such glasses include display technology by which computer information can be viewed by the user—either overlaid on the scene in front of the user, or blocking that scene. Virtual reality goggles are an example of such apparatus. Exemplary technology is detailed in patent documents U.S. Pat. No. 7,397,607 and 20050195128. Commercial offerings include the Vuzix iWear VR920, the Naturalpoint Trackir 5, and the ezVision X4 Video Glasses by ezGear. An upcoming alternative is AR contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

The design of smart phones and other computer devices referenced in this disclosure is familiar to the artisan. In general terms, each includes one or more processors (e.g., of an Intel, AMD or ARM variety), one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, 3-axis gyroscopes, a microphone, etc., together with software instructions for providing a graphical user interface), interconnections between these elements (e.g., buses), and an interface for communicating with other devices (which may be wireless, such as GSM, CDMA, 4G, W-CDMA, CDMA2000, TDMA, EV-DO, HSDPA, WiFi, WiMax, mesh networks, Zigbee and other 802.15 arrangements, or Bluetooth, and/or wired, such as through an Ethernet local area network, a T-1 internet connection, etc).

More generally, the processes and system components detailed in this specification may be implemented as instructions for computing devices, including general purpose processor instructions for a variety of programmable processors, including microprocessors, graphics processing units, digital signal processors, etc. These instructions may be implemented as software, firmware, etc. These instructions can also be implemented to various forms of processor circuitry, including programmable logic devices, FPGAs, FPOAs, and application specific circuits—including digital, analog and mixed analog/digital circuitry. Execution of the instructions can be distributed among processors and/or made parallel across processors within a device or across a network of devices. Transformation of content signal data may also be distributed among different processor and memory devices.

Software instructions for implementing the detailed functionality can be readily authored by artisans, from the descriptions provided herein, e.g., written in C, C++, Visual Basic, Java, Python, Tcl, Perl, Scheme, Ruby, etc. Mobile devices according to the present technology can include software modules for performing the different functions and acts.

Commonly, each device includes operating system software that provides interfaces to hardware resources and general purpose functions, and also includes application software which can be selectively invoked to perform particular tasks desired by a user. Known browser software, communications software, photography apps, and media processing software can be adapted for many of the uses detailed herein. Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

In the interest of conciseness, the myriad variations and combinations of the described technology are not cataloged in this document. Applicant recognizes and intends that the concepts of this specification can be combined, substituted and interchanged—both among and between themselves, as well as with those known from the cited prior art. Moreover, it will be recognized that the detailed technology can be included with other technologies—current and upcoming—to advantageous effect.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

In view of the wide variety of embodiments to which the principles and features discussed above can be applied, it should be apparent that the detailed embodiments are illustrative only, and should not be taken as limiting the scope of the invention. Rather, I claim as my invention all such modifications as may come within the scope and spirit of the following claims and equivalents thereof.

I claim:

1. A method associated with image data provided by a user's portable device and comprising a first depiction of an object, the method comprising:
    processing the image data to derive identification data therefrom, said processing comprising applying a digital watermark decoding operation or applying an image fingerprinting operation;
    by reference to the identification data, identifying imagery related to the object; and
    associating the object and the user together, which said associating includes causing a depiction of the object, different than said first depiction of the object, to appear in a portion of a social network service associated with the user.

2. The method of claim 1 in which said processing comprises applying a digital watermark decoding operation.

3. The method of claim 1 in which said processing comprises applying an image fingerprinting operation.

4. The method of claim 1 in which the object comprises a substrate having printing thereon.

5. The method of claim 1 in which the object comprises a product package.

6. The method of claim 1 in which the object comprises a printed point of sale display in a retail store.

7. The method of claim 1 that includes capturing the image data using an image sensor in the portable device.

8. The method of claim 1, wherein the identified imagery related to the object includes imagery of the object depicted by the image data.

9. The method of claim 1, wherein the identified imagery related to the object includes imagery of another object different from the object depicted by the image data.

10. The method of claim 9 in which the object depicted by the image data is a retail product from a product brand, and the other object is a different retail product from said product brand.

11. The method of claim 1 in which:
    the image data is captured by a camera of the user's portable device; and
    the social network service comprises the Pinterest brand social network service.

12. The method of claim 1 in which the image data depicting said object is captured by a camera of the user's portable device, wherein the method further includes:
    presenting a gallery of plural alternative images on a display of said portable device, for the user to select therebetween; and
    posting, to said social network service, one of said plural images selected by the user.

13. The method of claim 12 in which the selected image depicts said object.

14. The method of claim 12 in which the selected image depicts an item that is different than the object depicted in the captured imagery.

15. The method of claim 14 that further includes indicating, in said portion of the social network service associated with the user, that the user likes said item that is different than the object depicted in the captured imagery.

16. A method associated with image data captured by a user's portable device and depicting an object, the method comprising:
    in a system comprising one or more processors, executing acts on the one or more processors, including:

receiving information indicating that a user likes the object;

upon receiving the information, processing the image data to derive identification data therefrom;

by reference to the identification data, identifying the object; and associating the identified object and the user together, by data posted to a social network service wherein the data posted to the social network service comprises image data different than the image data captured by the user's portable device.

17. The method of claim 16 in which said associating comprises adding a link to a network graph of the user, the link expressing a relationship between the user and a node corresponding to the object.

18. A method comprising:

receiving image data captured by a user's portable device, the image data comprising a first depiction of an object;

receiving an instruction to associate, within a social network service in which the user is a member, the user with the object;

upon receiving the instruction, processing the image data to derive identification data therefrom;

by reference to the identification data, identifying the object; and associating the object and the user together, by data posted to the social network service, in which said associating includes causing a depiction of the object, different than said first depiction of the object, to appear in a portion of the social network service associated with the user.

19. A method associated with image data provided by a user's portable device and depicting an object, the method comprising:

receiving a user instruction to like the object within a social networking service for which the user has an account;

upon receiving the instruction, processing the image data to derive identification data therefrom; and by reference to the identification data, liking the object on the user's account, wherein liking the object includes adding a link to a network graph of the user, the link expressing a relationship between the user and a node in the graph corresponding to the object.

20. A method comprising:

obtaining data indicating a user's location;

by reference to said data, identifying a collection of images that depict retail products near the user;

sending certain of said images to a user device for presentation to the user; and associating at least one of said images or products together with the user, by data posted to a social network service, in which said associating includes sending information to a computer at the social network service, said information expressing that the user likes said at least one of said images or products associated with the user.

* * * * *